United States Patent
Garner et al.

(10) Patent No.: US 10,375,879 B2
(45) Date of Patent: Aug. 13, 2019

(54) SOIL CHARACTERISTIC SENSORS ON GROUND-ENGAGING ELEMENTS OF A PLANTING MACHINE

(71) Applicant: Deere & Company, Moline, IL (US)

(72) Inventors: Elijah B. Garner, Bettendorf, IA (US); Nikolai Tevs, Daytona Beach Shores, FL (US); Michael L. Rhodes, Richfield, MN (US); Jeffrey S. Puhalla, Hawley, MN (US)

(73) Assignee: Deere & Company, Moline, IL (US)

( * ) Notice: Subject to any disclaimer, the term of this patent is extended or adjusted under 35 U.S.C. 154(b) by 75 days.

(21) Appl. No.: 14/874,218

(22) Filed: Oct. 2, 2015

(65) Prior Publication Data
US 2017/0094889 A1 Apr. 6, 2017

(51) Int. Cl.
| | | |
|---|---|---|
| A01C 21/00 | (2006.01) | |
| A01C 7/20 | (2006.01) | |
| A01C 5/06 | (2006.01) | |
| A01B 76/00 | (2006.01) | |
| A01C 7/08 | (2006.01) | |
| A01C 7/06 | (2006.01) | |

(52) U.S. Cl.
CPC ............ *A01C 21/007* (2013.01); *A01B 76/00* (2013.01); *A01C 5/062* (2013.01); *A01C 7/08* (2013.01); *A01C 7/201* (2013.01); *A01C 7/203* (2013.01); *A01C 7/206* (2013.01); *A01C 5/064* (2013.01); *A01C 7/06* (2013.01); *A01C 7/205* (2013.01)

(58) Field of Classification Search
CPC combination set(s) only.
See application file for complete search history.

(56) References Cited

U.S. PATENT DOCUMENTS

| | | | |
|---|---|---|---|
| 3,749,035 A | | 7/1973 | Cayton et al. |
| 4,031,963 A | * | 6/1977 | Poggemiller ........ A01B 63/114 111/200 |
| 4,238,790 A | | 12/1980 | Balogh et al. |
| 5,479,992 A | * | 1/1996 | Bassett ................ A01B 63/114 111/134 |
| 5,524,560 A | | 6/1996 | Carter |

(Continued)

FOREIGN PATENT DOCUMENTS

| | | |
|---|---|---|
| DE | 102012112567 A1 | 6/2014 |
| EP | 0171719 A2 | 2/1986 |

(Continued)

OTHER PUBLICATIONS

EP Extended Search Report Application No. 16191128.4, dated Feb. 14, 2017, 9 pages.

(Continued)

*Primary Examiner* — Alicia Torres
(74) *Attorney, Agent, or Firm* — Joseph R. Kelly; Kelly, Holt & Christenson PLLC

(57) ABSTRACT

A soil characteristic sensor is mounted on a soil engaging element of a planting machine. It can be mounted, for instance, on an element that engages the soil before a trench is opened, or after a trench is opened, but before it is closed. It can be mounted on an element that engages the soil in a region of the soil trench, but after the trench is closed. It can be mounted on a scraping element that scrapes a disc, and it can be mounted on wedges or other items that run through the soil, and are carried by shanks.

12 Claims, 12 Drawing Sheets

(56) References Cited

U.S. PATENT DOCUMENTS

| | | | |
|---|---|---|---|
| 5,533,458 A | 7/1996 | Bergland et al. | |
| 5,653,292 A * | 8/1997 | Ptacek | A01B 63/114 |
| | | | 172/239 |
| 6,116,172 A | 9/2000 | Prairie et al. | |
| 7,426,894 B2 | 9/2008 | Peterson et al. | |
| 7,584,707 B2 | 9/2009 | Sauder et al. | |
| 2003/0016029 A1 | 1/2003 | Schuler et al. | |
| 2006/0090680 A1 * | 5/2006 | Wendte | A01C 5/064 |
| | | | 111/135 |
| 2011/0313572 A1 * | 12/2011 | Kowalchuk | A01C 7/205 |
| | | | 700/275 |
| 2012/0042813 A1 * | 2/2012 | Liu | A01L 379/005 |
| | | | 111/149 |
| 2012/0186503 A1 * | 7/2012 | Sauder | A01C 7/205 |
| | | | 111/134 |
| 2014/0048001 A1 | 2/2014 | Bassett | |

FOREIGN PATENT DOCUMENTS

| | | |
|---|---|---|
| FR | 2660520 A | 10/1991 |
| GB | 1597358 A | 9/1981 |
| GB | 1502947 A | 2/2005 |
| WO | 2014153157 A1 | 9/2014 |
| WO | 2014186810 A1 | 11/2014 |
| WO | 2015143433 A2 | 9/2015 |
| WO | 2016205422 A1 | 12/2016 |

OTHER PUBLICATIONS

Weatherly et al., Automatic Depth Control of a Seed Planter Based on Soil Drying Front Sensing. 1997 American Society of Agricultural Engineers p. 295-305.

EP Application No. 16191128.4-1011 Communication pursuant to Article 94(3) EPC dated Mar. 5, 2018, 7 pages.

* cited by examiner

SOIL CHARACTERISTIC SENSORS ON GROUND-ENGAGING ELEMENTS OF A PLANTING MACHINE

FIELD OF THE DESCRIPTION

The present description relates to agricultural equipment. More specifically, the present description relates to deployment of soil characteristic sensors, and other sensors, on ground-engaging portions of the agricultural equipment.

BACKGROUND

There are a wide variety of different types of agricultural seeding or planting machines. They can include row crop planters, grain drills, air seeders, or the like. These machines place seeds at a desired depth within a plurality of parallel seed trenches that are formed in the soil. Thus, such systems have mechanisms that open a trench in the soil, drop seeds into the soil, and close the soil.

In addition, such machinery may also have mechanisms for dispersing fertilizer, or other chemicals, adjacent the seeds. The fertilizer, or other chemical, is often dispersed slightly below the seeds, within the soil, or off to one or both sides of the seed. Thus, there are a variety of different types of mechanisms that come into engagement with the soil.

The discussion above is merely provided for general background information and is not intended to be used as an aid in determining the scope of the claimed subject matter.

SUMMARY

A soil characteristic sensor is mounted on a soil engaging element of a planting machine. It can be mounted, for instance, on an element that engages the soil before a trench is opened, or after a trench is opened, but before it is closed. It can also be mounted on an element that engages the soil in a region of the soil trench, but after the trench is closed. It can be mounted on a scraping element that scrapes a disc, and it can be mounted on wedges or other items that run through the soil, and are carried by shanks.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

There are a wide variety of different types of seeding or planting machines. They can each use different ground engaging elements in order to engage the ground to open a trench in which seeds are placed, and then to close the trench on top of the seeds. In addition, these types of machines can also include soil engaging mechanisms for dispersing fertilizer or other chemicals in close proximity to the seed trench.

Figure 1:
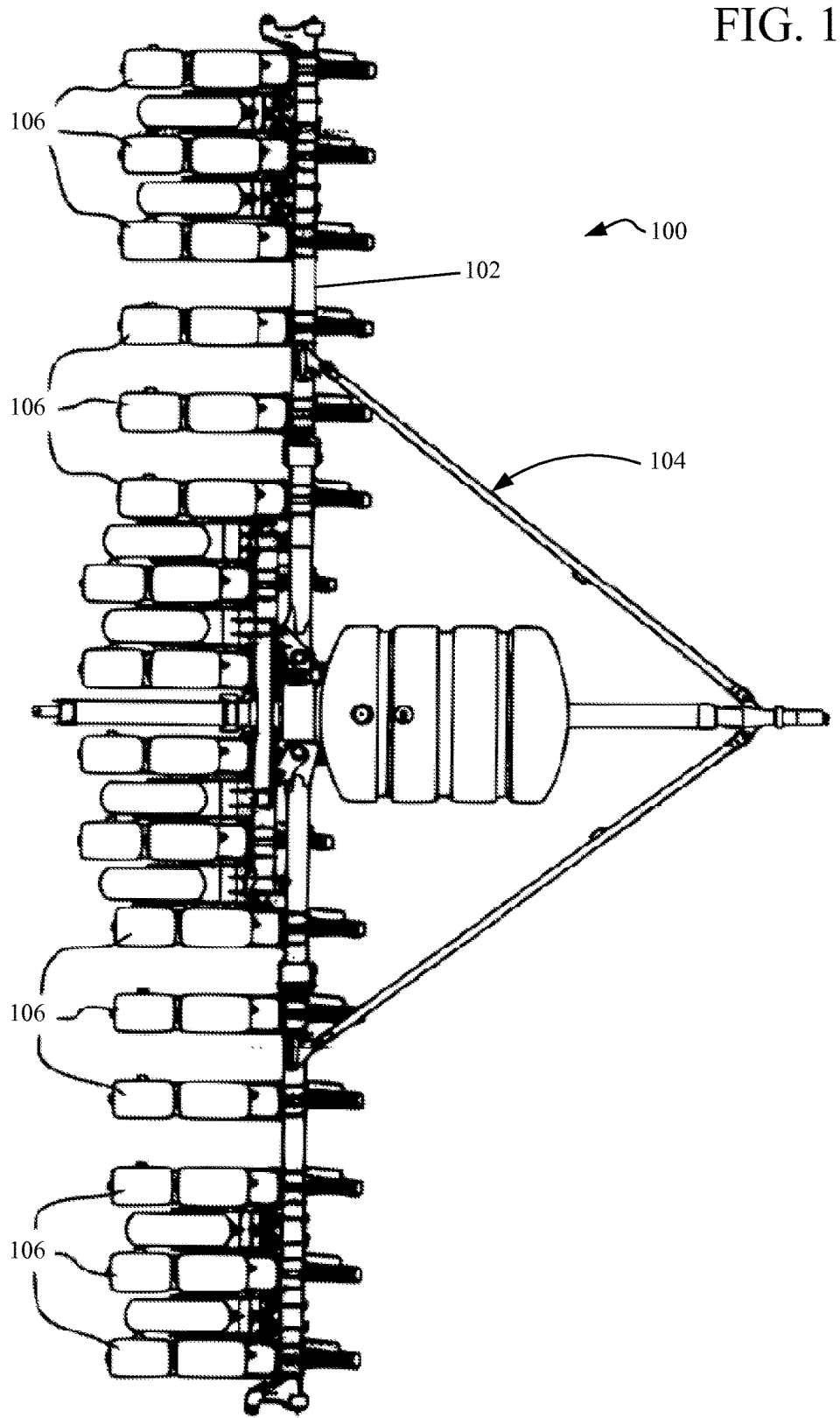
FIG. 1 shows one example of a top view of a planting machine.

FIG. 1 is a top view of one example of an agricultural seeding machine 100. Seeding machine 100 illustratively includes a toolbar 102 that is part of a frame 104. FIG. 1 also shows that a plurality of planting row units 106 are mounted to the toolbar. Machine 100 can be towed behind another machine, such as a tractor.

Figure 2:
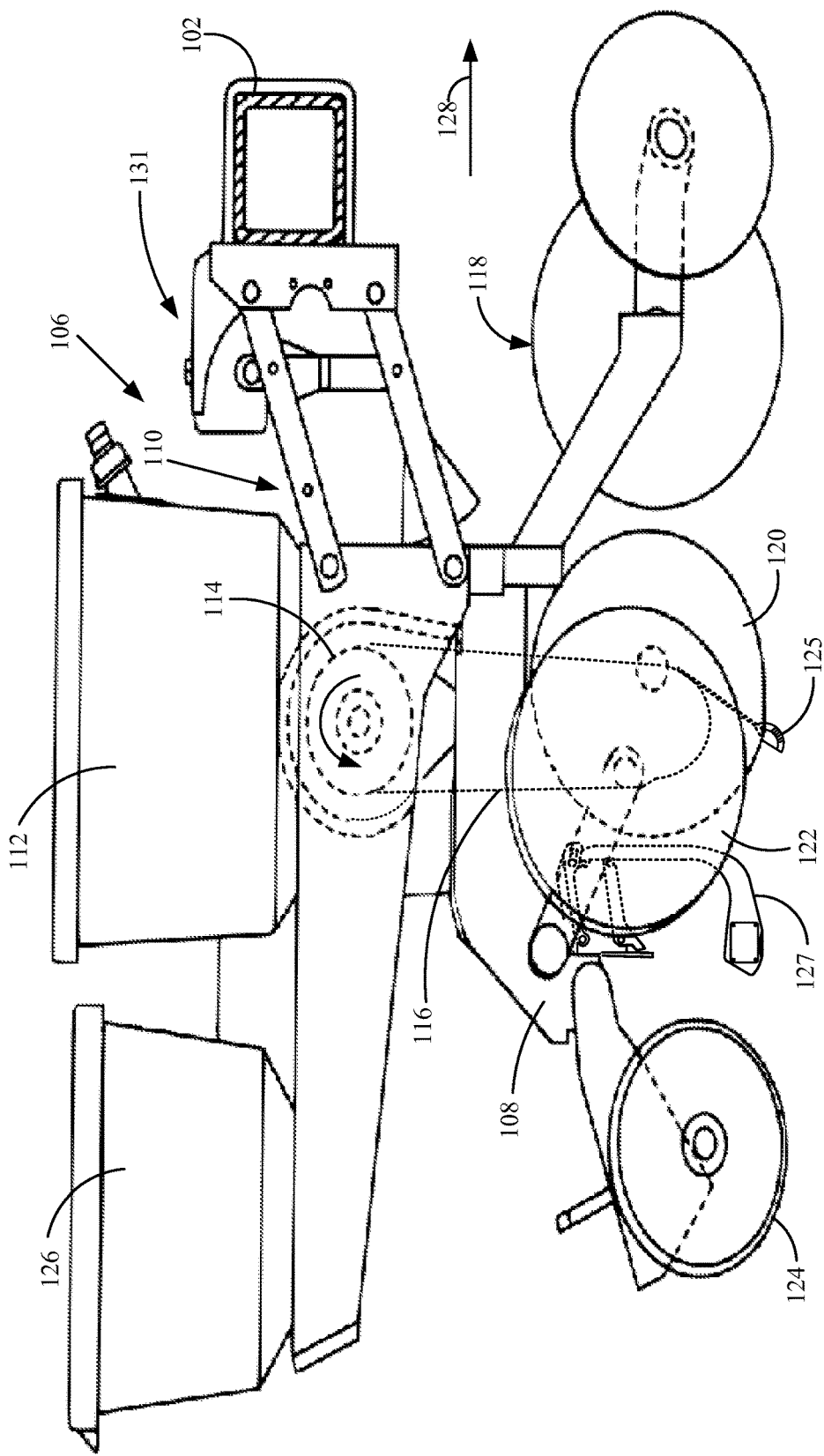
FIG. 2 shows one example of a side view of a row unit of the planting machine shown in FIG. 1.

FIG. 2 is a side view showing one example of a row unit 106 in more detail. FIG. 2 shows that each row unit 106 illustratively has a frame 108. Frame 108 is illustratively connected to toolbar 102 by a linkage shown generally at 110. Linkage 110 is illustratively mounted to toolbar 102 so that it can move upwardly and downwardly (relative to toolbar 102).

In the example shown in FIG. 2, row unit 106 has its own seed hopper 112 that stores seed. The seed is provided from hopper 112 to a seed metering system 114 that meters the seed and provides the metered seed to a seed delivery system 116 that delivers the seed from the metering system 114 to the furrow or trench generated by the row unit. FIG. 2 also shows that row unit 106 can have one or more ground engaging sensor support members or probes 125 and 127. Members 125 and 127 can carry a variety of different types of sensors, such as electrodes, which form capacitive sensors, or other sensors. The sensors can be used to sense a wide variety of different types of soil characteristics.

For instance, in one example, the sensor measurement taken by sensors carried by members 125 and 127 can be used to sense complex impedance, simple capacitance, or various other soil characteristics. The sensor signals can be processed, for instance, to obtain a measure of the soil characteristics, such as soil moisture, soil compaction, soil temperature, seed depth, soil fertility, and soil type, among others.

FIG. 2 also shows that, in one example, row unit 106 illustratively includes a row cleaner 118, a furrow opener 120, a set of gauge wheels 122, and a set of closing wheels 124. It can also include an additional hopper 126 that can be used to provide additional material, such as fertilizer or another chemical.

In operation, as row unit 106 moves in the direction generally indicated by arrow 128, row cleaner 118 generally cleans the row and opener 120, which is shown as a double disc opener, opens a furrow or trench in the row. Gauge wheels 122 illustratively control a depth of the furrow, and seed is metered by metering system 114 and delivered to the furrow by seed delivery system 116. Members 125 and 127 can be spring biased into engagement with the soil, or rigidly attached to frame 108. Thus, member 125 contacts the soil in an area within or closely proximate the trench, immediately after the trench is opened, but before the seed is placed therein. Member 125 can contact the side of the trench, the bottom of the trench, an area adjacent the trench, or other areas, and it is positioned so that it senses the desired characteristic shortly before the seed is placed in the furrow, or trench. In one example, member 127 also engages the soil within, or closely proximate the trench. It senses the desired characteristic shortly after the seed is placed in the furrow but before the trench is closed. Closing wheels 124 close the trench over the seed. A downforce actuator 131 can also be provided to controllably exert downforce to keep the row unit in desired engagement with the soil.

It will also be noted that, while FIG. 2 shows one example of seed metering system 114 having a rotatable element, other types of seed metering systems could be used as well. In addition, while FIG. 2 shows that seed delivery system 116 is an assistive type of system, that actively captures the seed from the seed meter and physically moves the seed toward a lower opening where the seed exists into the trench, it could be any of a variety of other types of systems as well. For instance, one seed delivery system is a gravity drop system that includes a seed tube, that has an inlet position below the seed metering system. Metered seeds from the seed metering system 114 are dropped into the tube and fall (via gravitational force) through the seed tube into the seed trench. Other seed delivery systems may employ pneumatic pressure to convey the seed through a tube from the meter to the trench. All of these, and other types, of seed metering systems 114 and seed delivery systems 116 are contemplated herein.

Figure 3:
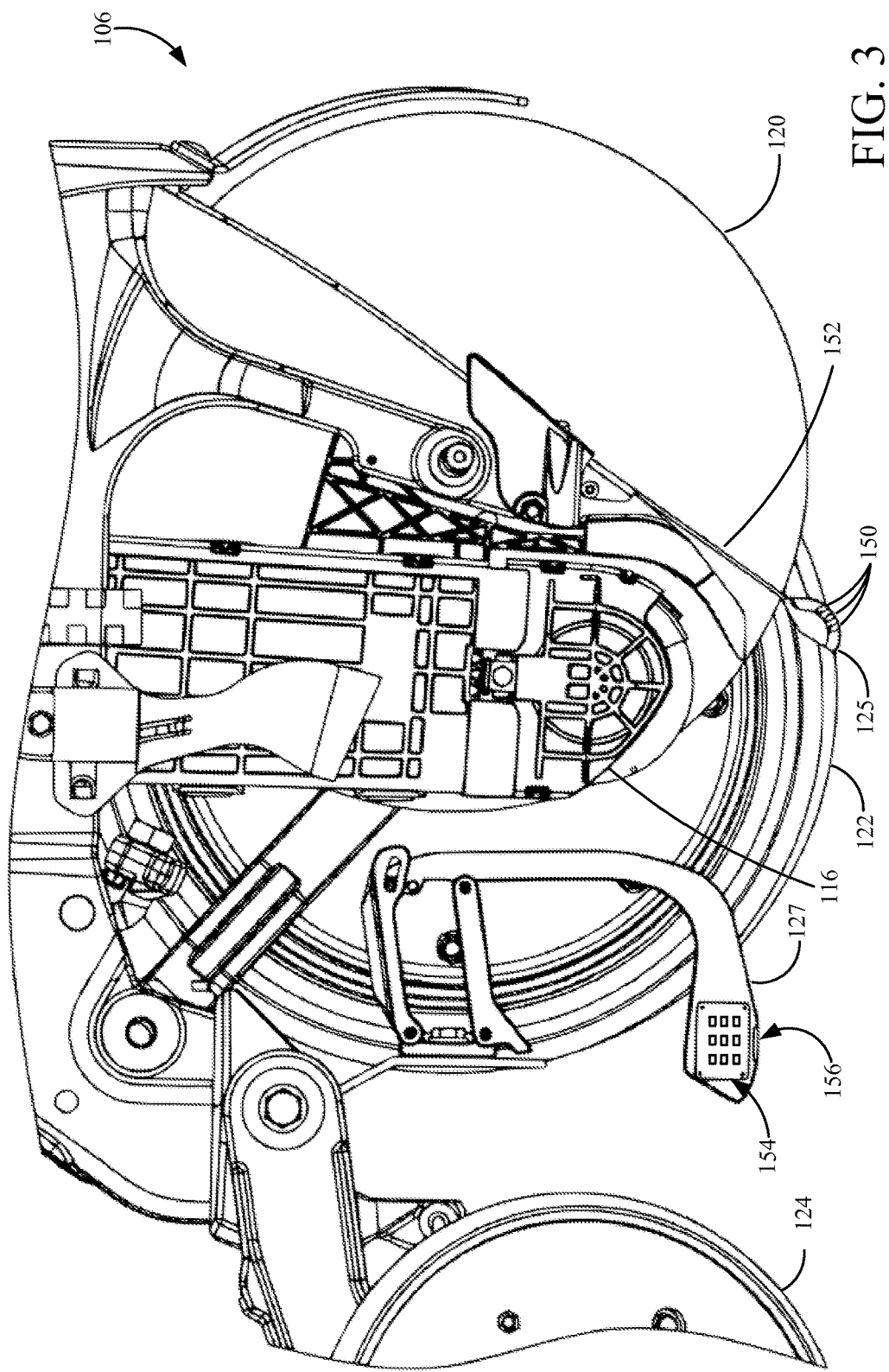
FIG. 3 shows a side view of a portion of the row unit shown in FIG. 2, with a gauge wheel and an opening disc removed.
Figure 4:
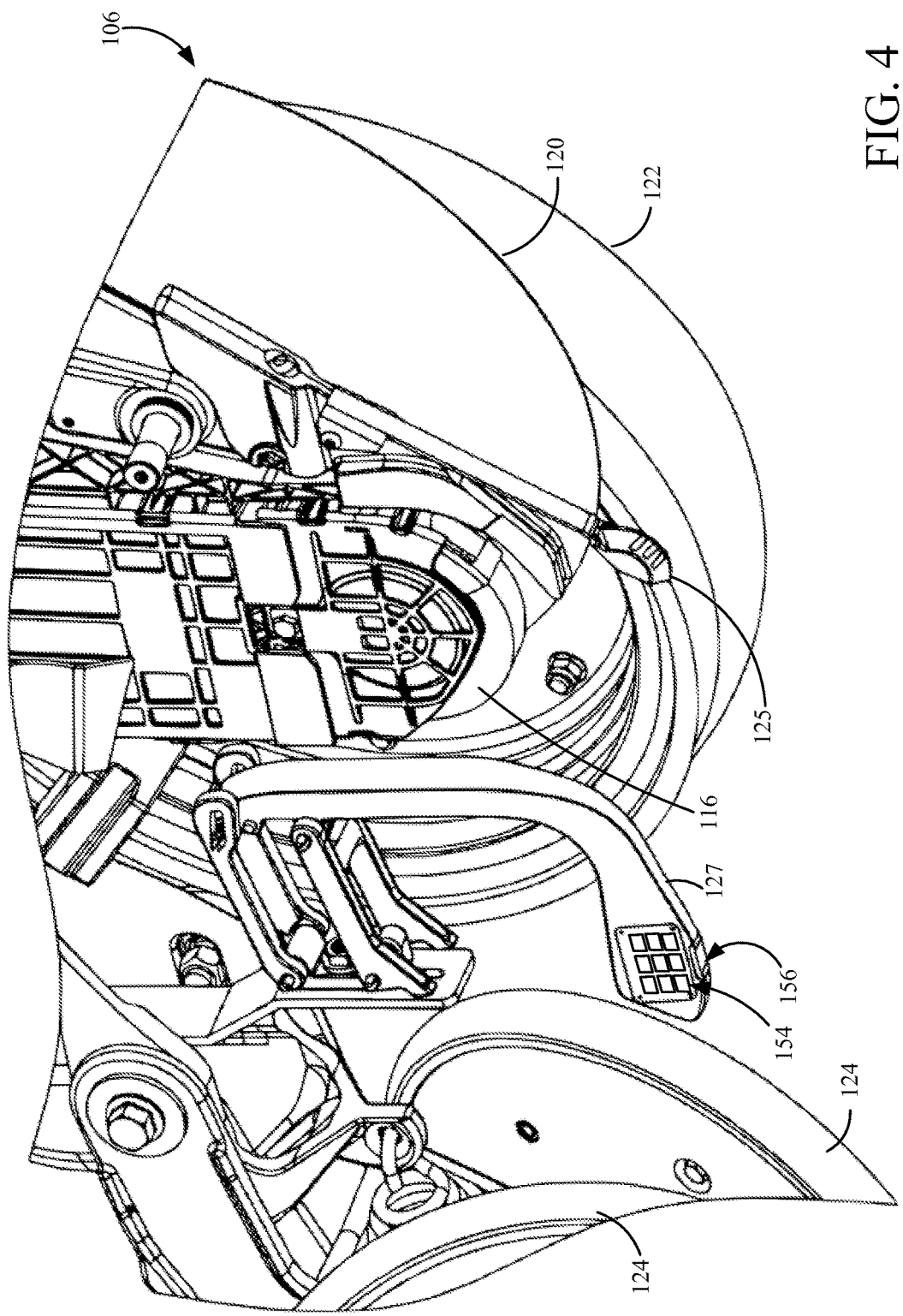
FIG. 4 shows a set of ground engaging elements with sensors, on the row unit illustrated in FIG. 3.

FIGS. 3 and 4 show a more detailed view of a portion of the row unit 106 shown in FIG. 2, with one of gauge wheels 122 and openers 120 removed. FIGS. 3 and 4 are now described in conjunction with one another. Sensor support member 125 can carry one or more sensors, or an array of more than two sensors. The sensors are generally indicated by 150. Element 125 is biased into contact with the soil by a bias member, or spring 152.

The sensors in sensor array 150 are illustratively in electrical contact with a sensor processing system (such as the system described in greater detail below with respect to FIG. 11) using any of a wide variety of different connection mechanisms. For instance, one or more electrical conductors corresponding to each of the sensors in sensor array 150 can be printed on (or within) element 125 and run along bias member 152, upwardly on row unit 106, where they electrically attach to a harness or harness assembly (not shown) which is routed to the system illustrated in FIG. 11 (such as over a CAN bus or another link). Alternatively, the electrical conductor can make electrical contact with a communication system that communicates wirelessly with the system illustrated in FIG. 11. These are only two examples of how electrical contact can be made with the sensors in sensor array 150, and others can be used as well.

FIGS. 3 and 4 also show another example in which sensor support member 127 carries one or more sensors or a set of sensors in a sensor array. The sensors are shown generally at 154. Further, the one or more sensors or sensor array 156 can, instead, or in addition, be disposed on the lower surface of sensor support member 127. Therefore, the sensors 154 can be disposed to engage (and sense a characteristics of) soil on the side of member 127, as it moves through the soil and the sensors 156 can be disposed to engage (and sense characteristics of) soil below member 127, as it moves through the soil. In one example, member 127 can be mounted so that it is slightly offset in a direction transverse to the direction of travel of row unit 106, from the center of the seed trench (where the seed strip is placed).

Figure 5:
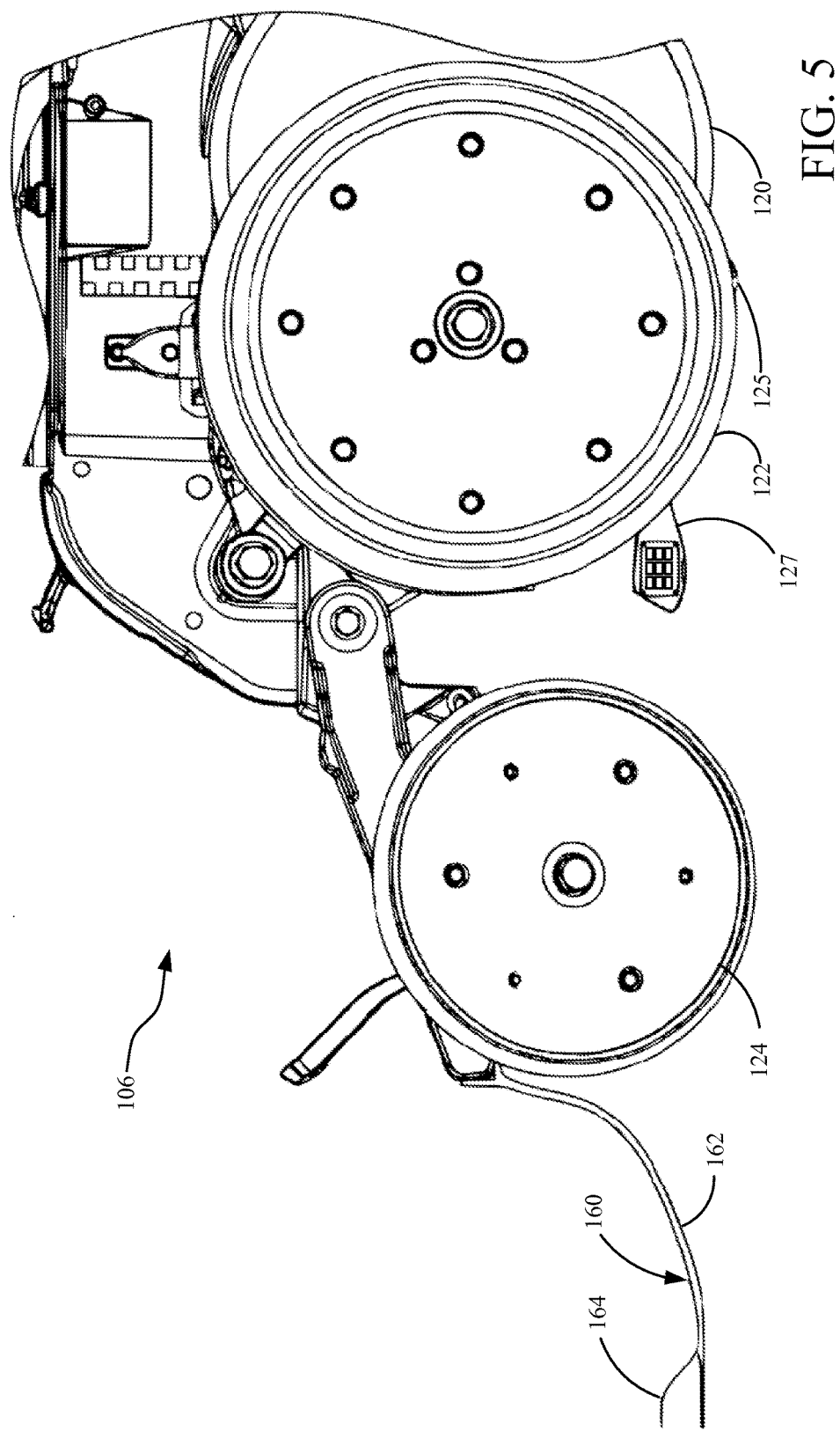
FIGS. 5 and 6 show a portion of the row unit with sensors mounted on a ground engaging element that follow a set of closing wheels.
Figure 6:
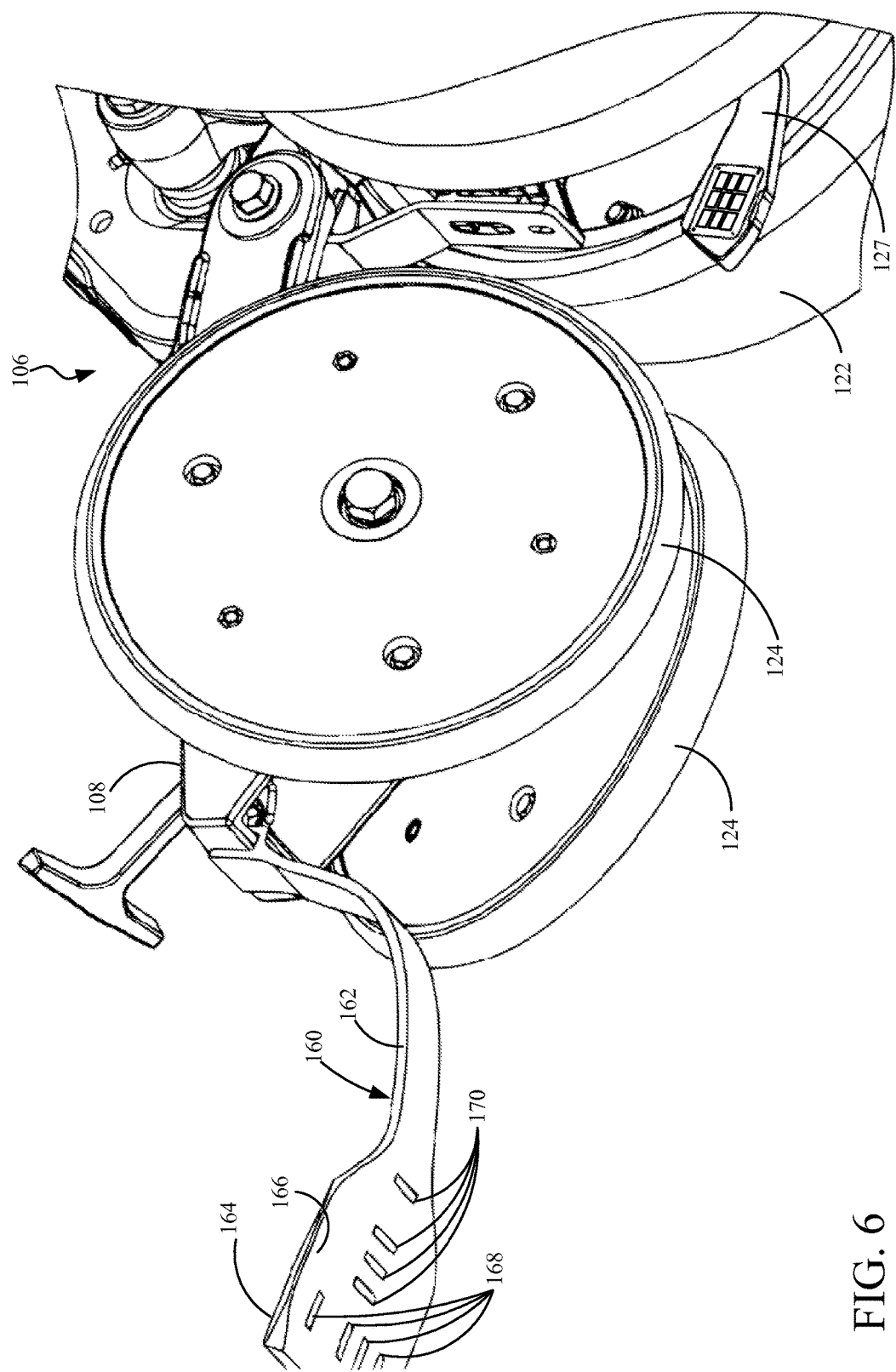

The sensed characteristics can be used to control controllable subsystems on the row unit (such as downforce, closing wheel downforce, gauge wheel settings, etc.), on the entire planting machine, or on the towing vehicle. Some examples are described in more detail below. FIGS. 5 and 6 show yet another example of row unit 106. Some elements are similar to those shown in the previous figures, and therefore they are similarly numbered. FIGS. 5 and 6 will now be described in conjunction with one another.

FIGS. 5 and 6 show an additional sensor support member 160. Member 160 illustratively includes a bias member 162 and a sensor carrying portion 164. Bias member 162 illusively biases a lower surface 166 of sensor carrying portion 164 into engagement with the ground, after the trench is closed by closing wheels 124. The lower surface 166 illustratively has one or more sensors that can be arranged in different configurations to form a single sensor, one or more pairs of sensors, or one or more sensor arrays.

FIG. 6 shows a set of longitudinally arranged sensors 170 and a set of transversely arranged sensors 168. These arrangements are shown by way of example only, and other arrangements can be used.

Again, the sensors can be a wide variety of different types of sensors, such as electrodes, protruding probes (which protrude from surface 166), mechanical resilience sensors (which can, for instance, be used to sense soil compaction characteristics), or a wide variety of other sensors. They can be electrically connected to a signal processing system (such as that described below with respect to FIG. 11) in a wide variety of different ways. As discussed above, one or more conductors can be formed on or within portion 164 and portion 162 and can extend up to frame portion 108. There, they can either be electrically connected to a cable harness, which can be used to transmit information to the signal processing system (such as over a CAN bus or otherwise), or they can be connected to a wireless communication system which can be used to communicate the information to the signal processing system using a wireless communication mechanism, such as a near field communication mechanism or a cellular communication mechanism, among others.

It will also be noted that a sensor supporting member 160 can be mounted forward of opener 120. The sensors can thus sense the characteristics of the soil prior to opening the trench. As discussed below, characteristics such as soil compaction, moisture, residue, etc., when sensed before opener 120 arrives, can be used to control controllable systems (such as downforce actuator 131) for better performance.

Figure 7:
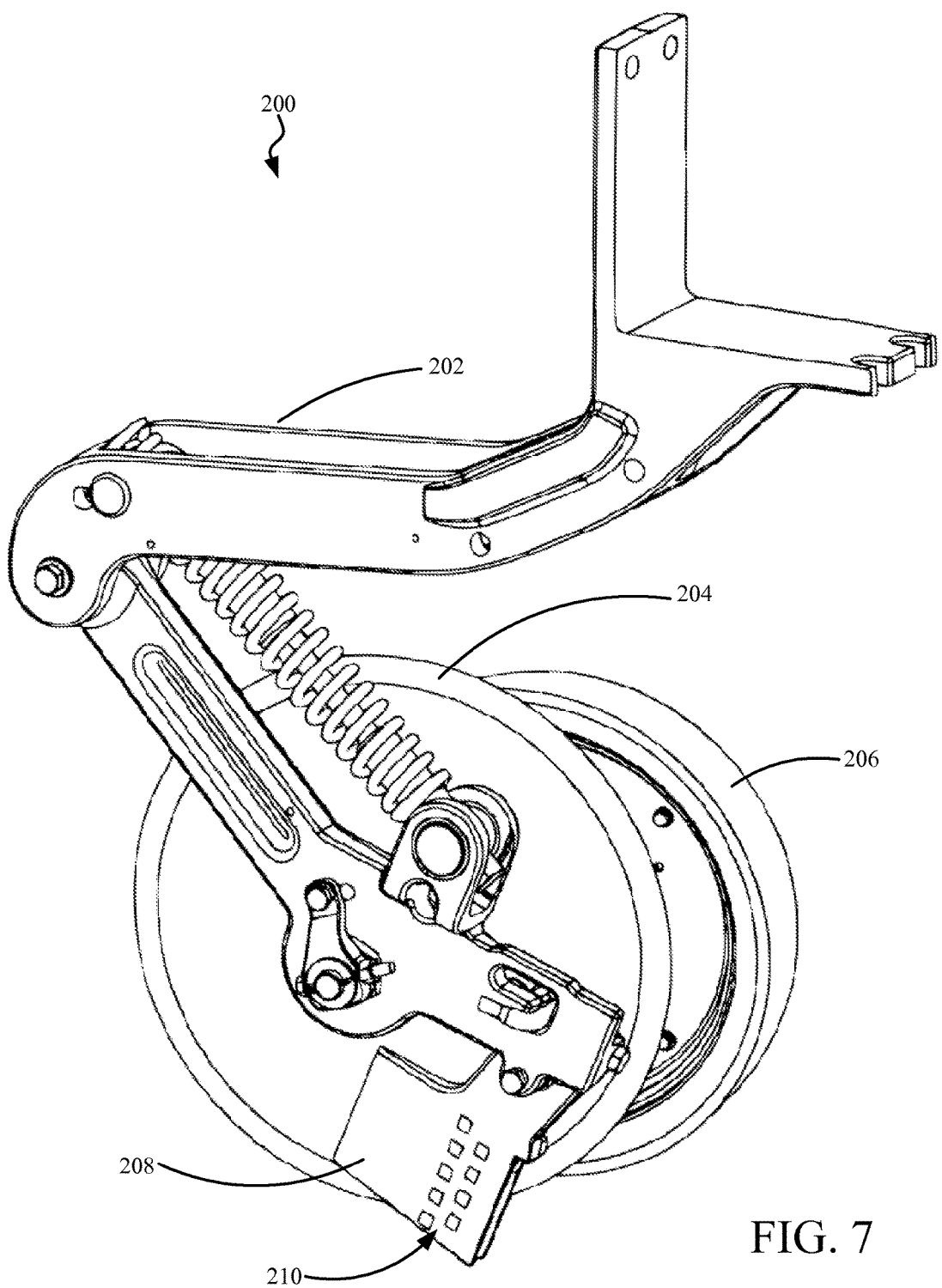
FIG. 7 shows a set of sensors mounted on a scraper that can be used with a fertilizer opener or seed opener.

FIG. 7 shows yet another example of an opener assembly 200. Opener assembly 200 illustratively has a frame 202 that supports a single disc opener 204 and a gauge wheel 206. In the example shown, opener 204 can open a trench in the soil for fertilizer, or seed, or for another chemical, etc. Opener assembly 200 also illustratively includes a scraper 208. Scraper 208 is mounted adjacent opener 204 so that it removes soil that adheres to opener 204, while opener 204 is opening a trench. Scraper 208 is shown with a set of sensors that form sensor array 210. Because scraper 210 is disposed closely proximate opener 204, at its lower end, sensor array 210 may illustratively be disposed, at least partially, within the trench that is opened by opener wheel 204. Therefore, it can measure soil characteristics, such as trench depth. In addition, it may also be disposed to come into contact with a side of the trench, or with the soil, in other ways. Therefore, it can sense other characteristics of the soil as well.

As with the other sensor arrays described with respect to the other figures, the sensors in sensor array 210 can be electrically connected to a system (such as that shown in FIG. 11) using electrical conductors that are formed on or within scraper 208, using electrical wires, or using other electrical contact mechanisms. The scraper 208 can be provided with only a single sensor or a pair of sensors as well, instead of an array.

Figure 8:
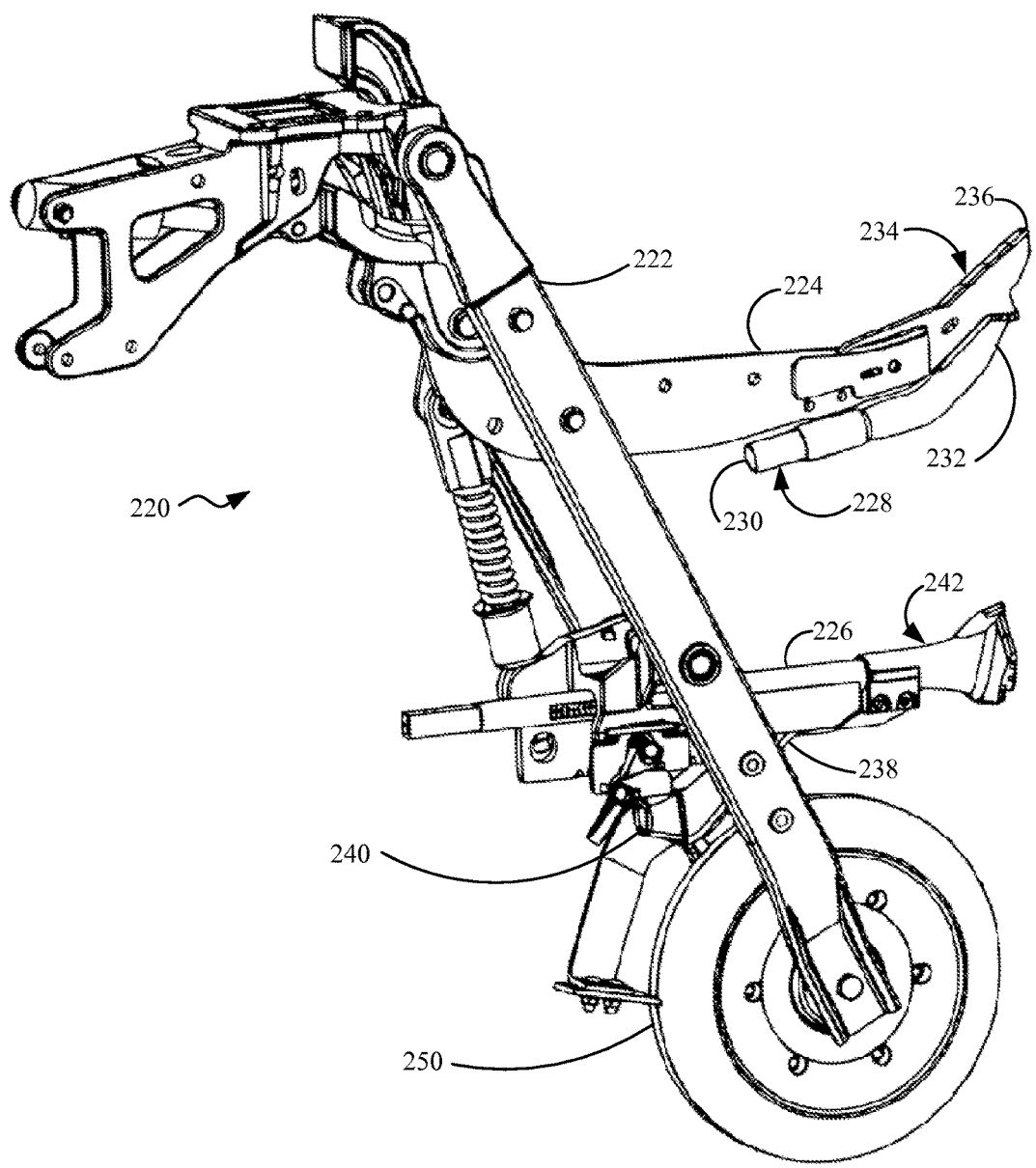
FIGS. 8-10 show various views of a set of opener shanks that can be used with an air drill.
Figure 9:
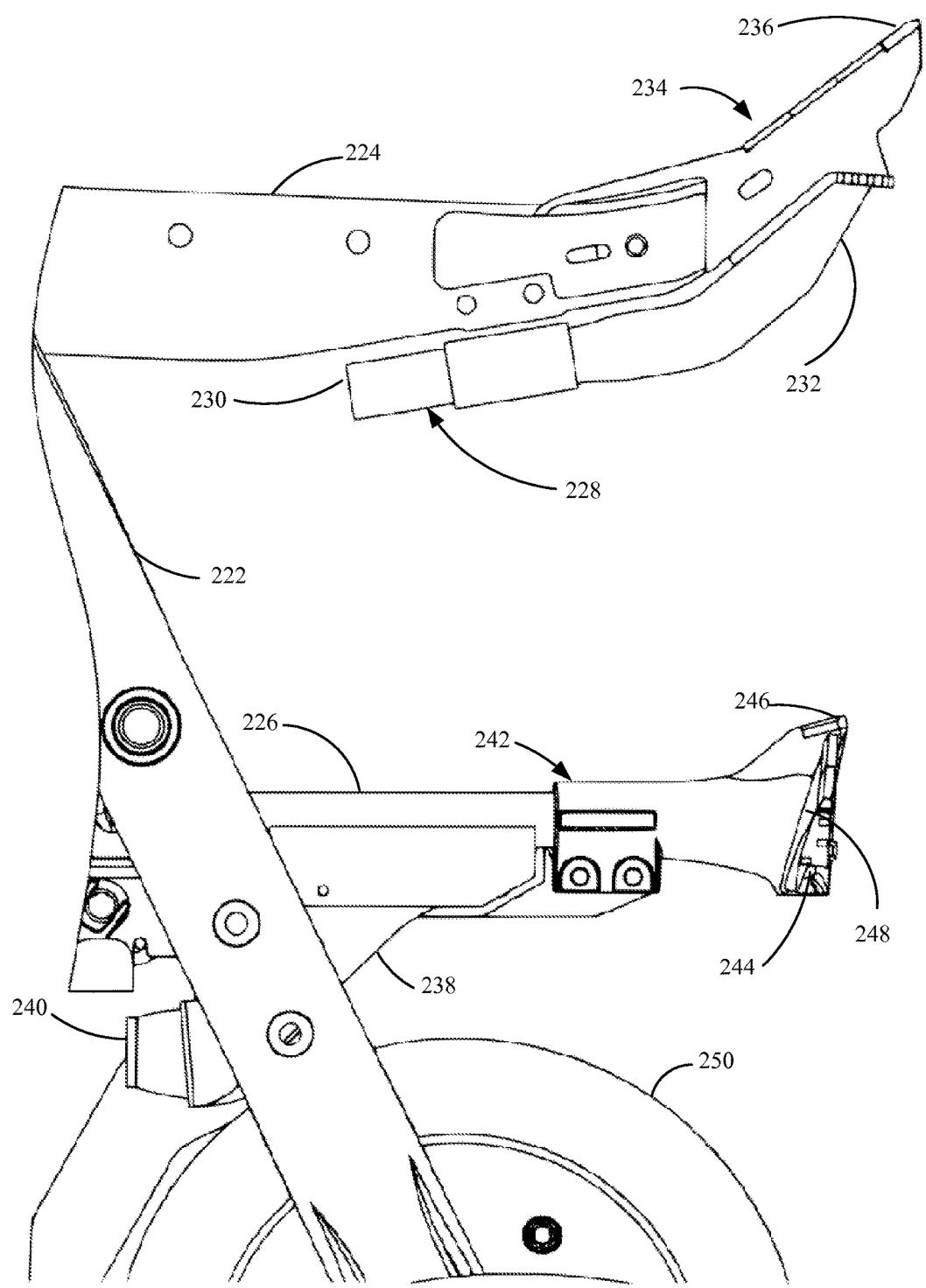
Figure 10:
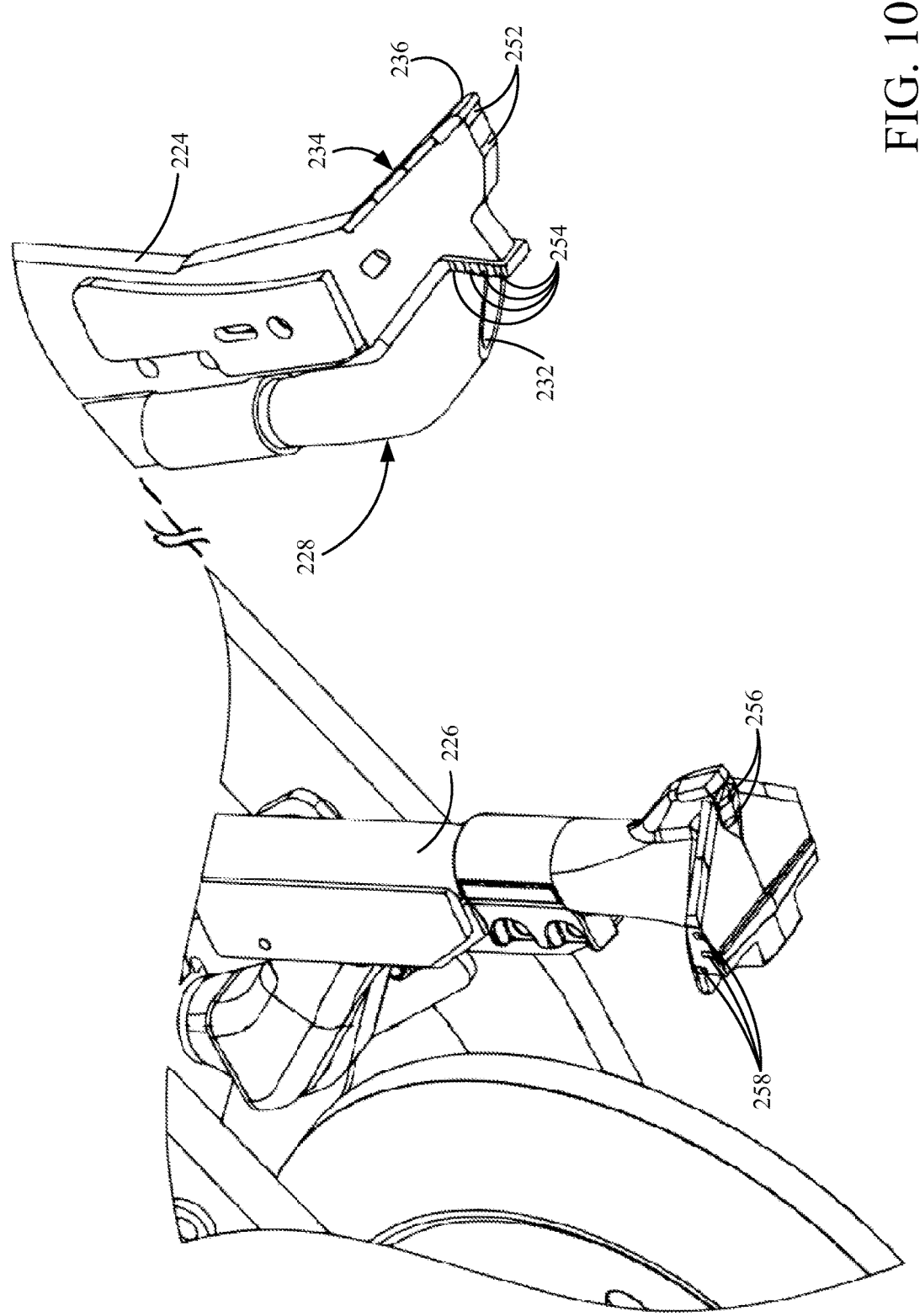

FIGS. 8-10 show another example of a row unit 220. Row unit 220 can be used to open a trench in the soil, and deposit seeds and fertilizer (or other chemicals) for instance, in the trench. In one example, row unit 220 is used on an air drill. An air drill can be configured to receive seed and fertilizer (or other chemical) from an air cart that is towed behind, or in front of, the air drill, itself.

In the example shown in FIG. 8, row unit 220 illustratively includes a structural frame 222 that supports a set of depending shanks 224 and 226. Shank 224 has a wedge or boot 234 that is illustratively disposed to engage the soil more deeply than a wedge or boot 242 carried by shank 226. Boot 234 includes a fertilizer delivery tube 228 that has an inlet end 230 that can be connected to a hose, or other conduit, and that receives fertilizer. Fertilizer tube 228 also has an outlet end 232 where the fertilizer exits. Shank 224 has the wedge or boot 234, at its distal end. Wedge 234 has a ground engaging tip 236 that engages the soil and forms a trench that receives fertilizer from the outlet end 232 of fertilizer tube 228.

Shank 226 includes a seed tube 238 that has an inlet end 240 and an outlet end that terminates within a seed depositing portion of wedge 242. The seed exits wedge 242 at opening 244. Wedge 242 illustratively has a front tip portion 246 and a sweep portion 248. Tip portion 246 opens a seed trench in the soil, and sweep portion 248 causes the soil to move upwardly, over the seed exit opening 244, as wedge 242 moves through the soil.

FIG. 9 specifically shows that, in one example, wedge 234 is disposed to engage the soil more deeply than wedge 242. It can also be offset to one side or the other so that the fertilizer is laid down in a strip within the soil that is adjacent to, and slightly below, the strip of seeds that is laid down in the soil by wedge 242. Row unit 220 also illustratively includes one or more closing wheels 250 that close the trench and firm the soil so that both the seeds and fertilizer are covered with soil.

FIG. 10 shows that, in one example, one or more sensors 252 can be used for form a single sensor, a sensor pair or a sensor array on the fertilizer opener. Alternatively, or in addition, another set of sensors 254 can be disposed to form a different single sensor, sensor pair or sensor array on the fertilizer opener. Sensors 252 will engage the soil on the bottom of the fertilizer trench, while sensors 254 illustratively engage the soil on the sides of that trench. Therefore, the sensor arrays formed by sensors 252 and 254 can be used to sense a wide variety of different types of soil characteristics, such as those discussed above.

FIG. 10 also shows that, in one example, wedge 242 illustratively has one or more sensors 256 that form a single sensor, one sensor pair or sensor array on wedge 242. It can include another set of sensors 258 that form another single sensor, sensor pair or sensor array on wedge 242. Again, because sensors 256 are disposed to engage the soil on the bottom of the seed trench, and sensors 258 are disposed to engage soil on the side of that trench, they can be configured to sense the same, or different, soil characteristics.

A number of examples of how the various sensors can be used will now be described. They are described for the sake of example only. Some of the sensor arrays (where there are more than two sensors or electrodes in a cluster) can provide more information than a sensor that simply has one or two electrodes. For instance, in places where the array is oriented vertically relative to the ground, adjacent pairs of electrodes can be used to sense the different levels of moisture at the different soil depths associated with each electrode pair. The array can also detect where the surface of the soil is with respect to the opener (which leads to an indication of the depth of the seed trench and hence seed depth). Such an arrangement can also indicate how much residue there may be on top of the soil. This is because the measured characteristics of the soil will differ from the measured characteristics of the residue.

The vertically arranged sensors can be arranged so that one of the sensors (or electrodes) is an emitter electrode and the others are receiver electrodes that are vertically spaced at different distances from the emitter electrode. Therefore, the different sensor pairs can sense characteristics which are indicative of soil compaction or other characteristics. Because the emitter will have different spacing from the receivers in the array, soil compaction proximate the sensor (e.g., the sidewall compaction) can be sensed relative to compaction further away from the sensor (e.g., un-altered soil compaction). This is because the distance of penetration of the capacitive fringing effect into the surrounding soil is proportional to the distance between the electrodes. Therefore, an electrode pair (e.g., the emitter electrode and one sensing electrode) where the electrodes are spaced further apart from one another will be sensing the effects on the capacitive fringing effect from soil that is further from the electrode pair, than an electrode pair where the electrodes are spaced closer together. While soil compaction has been discussed, the same is true of other soil characteristics.

In places where the sensor array is arranged generally horizontally relative to the surface of the ground, one of the electrodes may be arranged as an emitter that emits an electrical signal, while the others are configured as receivers. In this arrangement, the receiving electrodes are at different distances from the emitter electrode. Thus, various pairs of electrodes can sense moisture and compaction (or other characteristics) at different depths and soil volumes relative to the sensor platform. This can be measured because the depth of penetration of the capacitive fringing effect (which is measured by a given electrode pair) is proportional to the distance between the electrodes.

It will also be noted that, while the present discussion has proceeded with respect to the sensors being disposed on ground engaging portions of a planting machine, they could be disposed on other agricultural equipment as well. For instance, they can be used on tillage or fertilizer equipment where no seeding elements are present.

By way of example, the ground engaging elements of the tillage implement can be rippers or sweeps of various sizes, which are similar to the shanks discussed above with respect to FIGS. 8-10, without the seeding equipment. The tillage implement may also have a vertical tillage or deep tillage disk or plow share which can have a scraper, similar to that shown above in FIG. 7. A fertilizer tool (which does not plant any seed) can be equipped with a tyne-style opener and/or a rolling blade opener (similar to that shown above in FIG. 7). These types of implements and tools may also have closers, although they may not as well.

Figure 11:
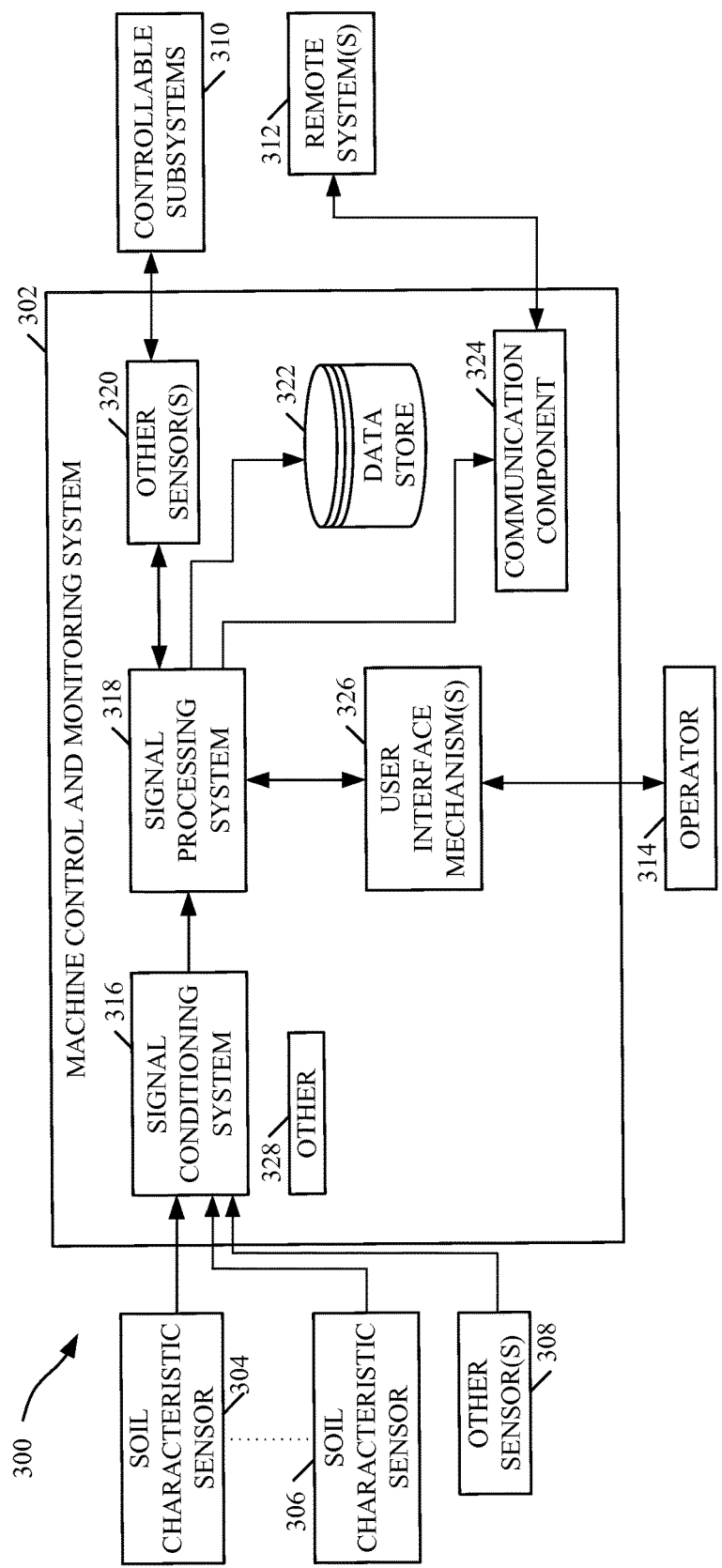
FIG. 11 is a block diagram of one example of a machine control and monitoring system.

FIG. 11 is a block diagram of one example of a control system architecture 300 that can be used with the sensors described above. Architecture 300 illustratively includes machine control and monitoring system 102 that receives sensor signal inputs from one or more soil characteristic sensors 304-306, and it can also receive a sensor signal input from a variety of other sensors 308. The sensor signals can be from any of the sensors described above.

System 302 also generates control signals for controlling controllable subsystems 310. The controllable subsystems 310 can be on the implements that carry the sensors (such as pneumatic systems, hydraulic systems, electric systems, etc.), or they can be on other machines (such as tractors that tow the implements, or other machines). Architecture 300 also shows that system 302 can provide outputs of information to one or more remote systems 312. In addition, it shows that operator 314 can provide inputs for controlling and manipulating the machine on which the operator is located, and for receiving information from machine control and monitoring system 302.

In the example shown in FIG. 11, machine control and monitoring system 302, itself, illustratively includes signal conditioning system 316, processor 317, signal processing system 318, control system 320, data store 322, communication component 324, user interface mechanisms 326, and it can include a variety of other items 328. The sensor signals are received by signal conditioning system 316. System 316 can perform any desired signal conditioning. This can include, for instance, amplification, linearization, normalization, filtering, etc.

The signals are then provided to signal processing system 318 which can perform a wide variety of different types of signal processing. For instance, it can aggregate the signals, it can calculate various metrics based on the signals, or it can generate user interface signals that are provided to user interface mechanism 326 for display or other output to operator 314. It can provide the information to communication component 324, so that it can be sent to remote systems 312. It can provide the information to a local data store 322 where it can be stored, and later retrieved, by other systems and it can provide the information to control system 320, which generates the control signals that are used to control the various controllable subsystems. System 318 can generate various metrics indicative of soil moisture, compaction, temperature, seed depth, fertility, soil type, etc. These can be used to control the machine on-the-fly, automatically, or otherwise.

A number of data stores have been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that the elements of FIG. 11, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 12:
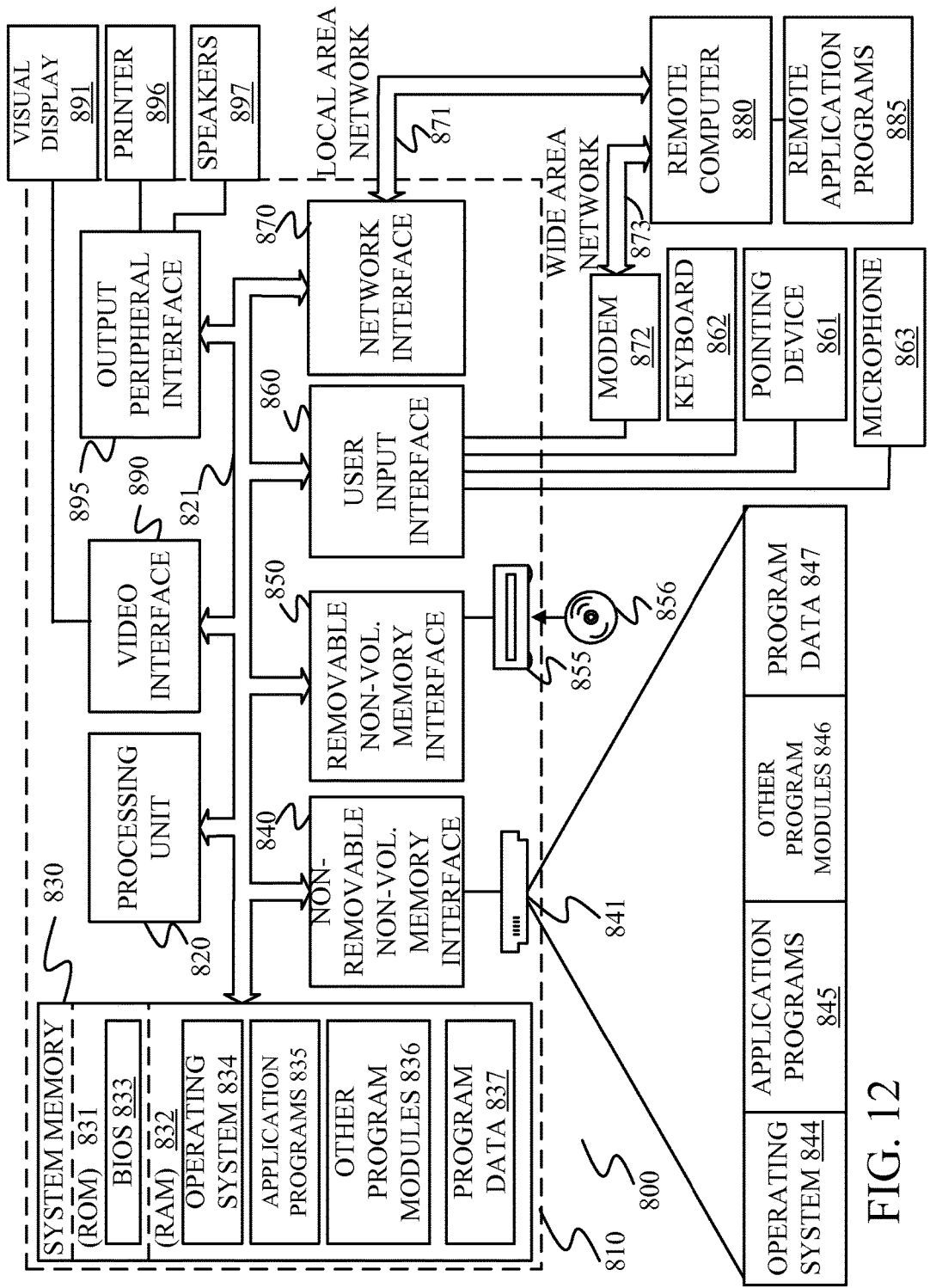
FIG. 12 is a block diagram of one example of a computing environment that can be used in the system shown in FIG. 11.

FIG. 12 is one example of a computing environment in which elements of FIG. 11, or parts of it, (for example) can be deployed. With reference to FIG. 12, an example system for implementing some embodiments includes a general-purpose computing device in the form of a computer 810. Components of computer 810 may include, but are not limited to, a processing unit 820 (which can comprise processor 317), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 11 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 12 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Example 1 is an agricultural planting machine that moves in a direction of travel, comprising:
   an opener, mounted to a structural frame, that opens a seed trench in soil;
   a seed delivery system that disperses seed in the seed trench;
   a closer, mounted to the structural frame, that moves soil over the seed trench to close the trench;
   at least one soil characteristic sensor element that generates a sensor signal indicative of a sensed soil characteristic; and
   a sensor supporting member that carries the at least one soil characteristic sensor element, the sensor supporting member mounted so the at least one soil characteristic sensor element engages the soil forward of the seed delivery system in the direction of travel.

Example 2 is the agricultural planting machine of any or all previous examples wherein the sensor supporting member includes an extending member that holds the at least one soil characteristic sensor element in engagement with the soil forward of the opener in the direction of travel.

Example 3 is the agricultural planting machine of any or all previous examples wherein the sensor supporting member includes an extending member that holds the at least one soil characteristic sensor element in engagement with the soil rearward of the opener in the direction of travel and forward of the seed delivery system in the direction of travel.

Example 4 is the agricultural planting machine of any or all previous examples wherein the sensor supporting member comprises:
   a sensor supporting portion that supports the at least one soil characteristic sensor element; and
   a bias member coupled to the sensor supporting portion to bias the sensor supporting portion into engagement with the soil.

Example 5 is the agricultural planting machine of any or all previous examples wherein the sensor supporting member comprises:
   a shank depending from the structural frame; and
   a soil engaging portion that engages the soil to generate an opening in the soil, the at least one soil characteristic sensor element being mounted on the soil engaging portion.

Example 6 is the agricultural planting machine of any or all previous examples wherein the at least one soil characteristic sensor element is mounted on a forward or laterally facing, soil engaging surface of the soil engaging portion.

Example 7 is the agricultural planting machine of any or all previous examples wherein the at least one soil characteristic sensor element is mounted on a bottom, soil engaging, surface of the soil engaging portion.

Example 8 is the agricultural planting machine of any or all previous examples wherein the sensor supporting member comprises:
   a chemical delivery tube that delivers chemical to the opening in the soil.

Example 9 is the agricultural planting machine of any or all previous examples wherein the sensor supporting member comprises:
   a seed delivery tube that delivers seed to the opening in the soil.

Example 10 is the agricultural planting machines of any or all previous examples wherein the soil characteristic sensor elements comprise an array of electrodes.

Example 11 is an agricultural planting machine that moves in a direction of travel, comprising:
   an opener, mounted to a structural frame, that opens a seed trench in soil;
   a seed delivery system that disperses seed in the seed trench;
   a closer, mounted to the structural frame, that moves soil over the seed trench to close the trench;
   a soil characteristic sensor element that generate a sensor signal indicative of a sensed soil characteristic; and
   a sensor supporting member that carries the soil characteristic sensor element, the sensor supporting member mounted so the soil characteristic sensor element engages the soil rearward of the closer in the direction of travel.

Example 12 is the agricultural planting machine of any or all previous examples wherein the sensor mounting member comprises:
- a depending member depending from the structural frame rearward of the closer; and
- a sensor supporting platform that has a bottom surface in engagement with the ground, the soil characteristic sensor element mounted on the bottom surface.

Example 13 is the agricultural planting machine of any or all previous examples wherein the sensor supporting member engages the soil that is moved over the seed trench by the closer.

Example 14 is the agricultural planting machine of any or all previous examples wherein the soil characteristic sensor element comprises a sensor array of electrodes.

Example 15 is an agricultural planting machine that moves in a direction of travel, comprising:
- an opener, mounted to a structural frame, that opens a seed trench in soil;
- a seed delivery system that disperses seed, in a seed strip, in the seed trench;
- a closer, mounted to the structural frame, that moves soil over the seed trench to close the trench;
- a soil characteristic sensor element that generate a sensor signal indicative of a sensed soil characteristic; and
- a sensor supporting member that carries the soil characteristic sensor element, the sensor supporting member mounted so the soil characteristic sensor element engages the soil along an engagement strip that is displaced in a direction transverse to the direction of travel, from the seed strip in the seed trench.

Example 16 is the agricultural planting machine of any or all previous examples wherein the sensor supporting member comprises:
- a sensor supporting portion that supports the soil characteristic sensor element; and
- a depending arm coupled to the sensor supporting portion and to the structural frame to hold the sensor supporting portion in engagement with the soil.

Example 17 is the agricultural planting machine of any or all previous examples wherein the depending arm supports the sensor supporting portion so the soil characteristic sensor element engages a sidewall of the seed trench.

Example 18 is the agricultural planting machine of any or all previous examples wherein the sensor supporting member supports the soil characteristic sensor element along the engagement strip that is located below the seed strip in the seed trench.

Example 19 is the agricultural planting machine of any or all previous examples wherein the opener comprises a disk opener and wherein the sensor supporting member comprises:
- a scraper mounted proximate the disk opener to remove soil from the disk opener, the soil characteristic sensing element being mounted on a side of the scraper facing generally away from the opener.

Example 20 is an agricultural machine, comprising:
- an opener, mounted to a structural frame, that opens an opening in soil;
- a soil characteristic sensor element that generates a sensor signal indicative of a sensed soil characteristic; and
- a sensor supporting member that has a proximal end mounted to the structural frame and a distal end, the sensor supporting member carrying the soil characteristic sensor element at a position closer to the distal end than the proximal end and mounted so the soil characteristic sensor element engages the soil.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims

What is claimed is:

1. An agricultural planting machine that moves in a direction of travel, comprising:
    an opener, mounted to a structural frame, that opens a seed opening in soil;
    a closer, mounted to the structural frame, that moves soil over the seed opening to close the seed opening;
    at least one soil characteristic sensor element that generates a sensor signal indicative of a sensed soil characteristic; and
    a seed delivery system that includes a seed delivery tube with a sensor supporting portion that carries the at least one soil characteristic sensor element, the sensor supporting portion engages the soil forward of the seed delivery tube so the at least one soil characteristic sensor element senses the soil forward of the seed delivery tube in the direction of travel and rearward of the opener in the direction of travel.

2. The agricultural planting machine of claim 1 wherein the sensor supporting member includes an extending member that holds the at least one soil characteristic sensor element in engagement with the soil forward of the opener in the direction of travel.

3. The agricultural planting machine of claim 1 wherein the sensor supporting portion comprises:
    a bias member coupled to the sensor supporting portion to bias the sensor supporting portion into engagement with the soil.

4. The agricultural planting machine of claim 2 wherein the sensor supporting member comprises:
    a shank depend ng from the structural frame; and
    a soil engaging portion that engages the soil to generate an opening in the soil, the at least one soil characteristic sensor element being mounted on the soil engaging portion.

5. The agricultural planting machine of claim 4 wherein, the at least one soil characteristic sensor element is mounted on a forward or laterally facing, soil engaging surface of the soil engaging portion.

6. The agricultural planting machine of claim 4 wherein the at least one soil characteristic sensor element is mounted on a bottom, soil engaging, surface of the soil engaging portion.

7. The agricultural planting machines of claim 1 wherein the at least one soil characteristic sensor element comprises an array of electrodes.

8. An agricultural planting machine that moves in a direction of travel, comprising:
    an opener, mounted to a structural frame, that opens a seed trench in soil;
    a seed delivery system that disperses seed, in a seed strip, in the seed trench;
    a closer, mounted to the structural frame, that moves soil over the seed trench to close the trench;
    a soil characteristic sensor element that generates a sensor signal indicative of a sensed soil characteristic; and
    a sensor supporting member that carries the soil characteristic sensor element ahead of the seed delivery system relative to the direction of travel, the sensor supporting member mounted so the soil characteristic sensor element engages the soil along an engagement strip, in the seed trench, that is displaced in a direction transverse to the direction of travel, from the seed strip in the seed trench.

9. The agricultural planting machine of claim 8 wherein the sensor supporting member comprises:
   a sensor supporting portion that supports the soil characteristic sensor element; and
   a depending arm coupled to the sensor supporting portion and to the structural frame to hold the sensor supporting portion in engagement with the soil.

10. The agricultural planting machine of claim 9 wherein the depending arm supports the sensor supporting portion so the soil characteristic sensor element engages the soil along the engagement strip that is located on a sidewall of the seed trench.

11. The agricultural planting machine of claim 9 wherein the sensor supporting member supports the soil characteristic sensor element along the engagement strip that is located below the seed strip in the seed trench.

12. The agricultural planting machine of claim 8 wherein the opener comprises a disk opener and wherein the sensor supporting member comprises:
   a scraper mounted proximate the disk opener to remove soil from the disk opener, the soil characteristic sensing element being mounted on a side of the scraper facing generally away from the opener.

\* \* \* \* \*